(12) United States Patent
Viaro et al.

(10) Patent No.: US 7,368,834 B2
(45) Date of Patent: May 6, 2008

(54) ELECTRONIC PROTECTION DEVICES FOR AUTOMATIC CIRCUIT-BREAKERS

(75) Inventors: Francesco Viaro, Albino (IT); Marco Stucchi, Osio Sotto (IT)

(73) Assignee: ABB Service S.r.l. (IT)

( * ) Notice: Subject to any disclaimer, the term of this patent is extended or adjusted under 35 U.S.C. 154(b) by 318 days.

(21) Appl. No.: 11/107,780

(22) Filed: Apr. 18, 2005

(65) Prior Publication Data

US 2005/0237216 A1 Oct. 27, 2005

(30) Foreign Application Priority Data

Apr. 19, 2004 (IT) .......................... MI2004A0760

(51) Int. Cl.
*H02J 9/00* (2006.01)
(52) U.S. Cl. ........................................ 307/64
(58) Field of Classification Search ................ 307/64
See application file for complete search history.

(56) References Cited

U.S. PATENT DOCUMENTS

| | | | | |
|---|---|---|---|---|
| 5,793,627 A * | 8/1998 | Caldes et al. ................ | 363/146 |
| 5,898,232 A * | 4/1999 | Reents et al. ................. | 307/18 |
| 5,943,246 A * | 8/1999 | Porter ......................... | 700/293 |
| 6,201,319 B1 * | 3/2001 | Simonelli et al. ............. | 307/26 |
| 6,650,322 B2 * | 11/2003 | Dai et al. .................... | 345/212 |
| 6,788,214 B2 * | 9/2004 | Lelecas ....................... | 340/654 |
| 2003/0098679 A1 * | 5/2003 | Odaohhara .................. | 323/284 |

* cited by examiner

*Primary Examiner*—Michael Sherry
*Assistant Examiner*—Michael Rutland-Wallis
(74) *Attorney, Agent, or Firm*—Connolly Bove Lodge & Hutz LLP; Myron K. Wyche

(57) ABSTRACT

Described herein is an electronic protection device for automatic circuit-breakers comprising: a control unit; a warning interface; a supply system comprising a main supply system and a first back-up supply system; an interface for connection between said supply system and said control unit, said connection interface comprising an automatic device for passage from the main supply to the back-up supply in the event of interruption of said main supply.

12 Claims, 1 Drawing Sheet

ELECTRONIC PROTECTION DEVICES FOR AUTOMATIC CIRCUIT-BREAKERS

FIELD OF THE INVENTION

The present invention relates to an electronic protection device for automatic circuit-breakers, and in particular an electronic protection device with maintenance of the functions of the main microcontroller, such as, for example, the clock function and functions of thermal memory and recall and display of real time, statistical and failure information, said device being functional even in the absence of power supply.

BACKGROUND OF THE INVENTION

The electronic protection devices (hereinafter referred to briefly as relays) of automatic circuit-breakers (hereinafter referred to briefly as circuit-breakers) enable detection, via purposely designed sensors, of the conditions of operation, and generate tripping commands which are to cause tripping of the circuit-breaker itself in the case of failures or overloads in the relevant portion of electrical network. By "tripping" is meant in the art the immediate opening of the main contacts of the circuit-breaker. Tripping generally occurs by means of a trip solenoid controlled by the relay.

There exist in the state of the art electronic relays that, in addition to fulfilling the functions of detection and command recalled above, can also provide information of various nature. The availability of said information, which is useful, for example, for the diagnosis of failures and faults, can vary substantially from model to model on the basis of the characteristics of design, and depends in particular upon the main microcontroller and the software installed. In electronic relays of a simple type, there is generally available information limited to the type of failure that has caused tripping of the relay. Said information is then converted via simple interfaces into warnings for the user (for example flags with the warning "short-circuit" or "overload"). More advanced relays, are normally able to manage sophisticated information, which can be translated into more complete and significant warnings. Said warnings can regard, for example, the network frequency, the amplitude of the circulating currents or of the voltages of the phases (supplied as real-time data, or statistical data, recorded for example when a failure occurs), or else the progressive number of the failure, fault, or tripping, or else the interrupted earth current or the interrupted power. Said warnings can also derive from processing, which are in any case complex, of all the information available (for example, statistical data on previous failures, estimation of the residual service life of the circuit-breaker, simulation of the so-called thermal memory). Relays of this latter type render the various information available via warning interfaces of various nature, such as, for example, light or acoustic warning devices, LEDs, or preferentially alphanumeric or graphic displays and digital communication ports.

In electronic relays of a simple type, there are normally used warning interfaces of a bistable type, such as, for example, magnetic warning flags (typically, "short-circuit" or "overload" flags). Said interfaces present the advantage of retaining the indication of the type of failure that has occurred also in the event of absence of the supply, but the information provided by them is somewhat limited.

The most advanced electronic relays are instead based upon the use of software and more sophisticated warning interfaces. These solutions absorb energy, and for their operation the relay requires an electrical supply. Said supply is generally derived with appropriate technical solutions from the same electrical network as the one on which the circuit-breaker is installed (direct supply), or else is derived from external sources (auxiliary supply).

In the case of dropping of the direct supply of the relay (a possibility that arises, for example, after tripping due to failure or fault, or simply in the event of a black-out) and of absence of an auxiliary supply, the relay itself, in order to be able to function at least partially, for example to guarantee the warnings, requires back-up supply systems.

Since the availability of a warning is particularly important precisely after an event of failure or fault, i.e., in the absence of supply, various technical solutions have been experimented and applied for rendering accessible or deducible by simulation some significant information. The simplest known solution consists in equipping the relay with magnetic flags similar to the ones used in relays of a simpler type, and already described in the text. In this case it is, however, possible to set only elementary warnings on the type of failure or fault.

Other known solutions, applied on relays of a more advanced type, tend to render available or to simulate a larger amount of information. Said solutions require that the information which it is intended to have available is appropriately retained by the main microcontroller of the relay or transferred in time to special additional memories operatively connected to the same microcontroller during normal operation. In order to function, these relays are equipped with a back-up supply system, which is activated manually by an operator and will enable activation, at least for a brief time, of the parts of the relay for managing the information and the warning interfaces.

In other words, in all the known solutions, in the absence of direct or auxiliary supply, the main microcontroller undergoes at least one temporary interruption of the supply with consequent arrest of the internal clock. The arrest of the clock causes a series of drawbacks that are well known to persons skilled in the sector. The first drawback consists in the loss of the current time, which must be restored. Other drawbacks are linked to the preclusion of the time variable from the functions of calculation used for deriving complex information.

One of the functions that it would be desirable to calculate precisely using the time variable is, for example, the thermal memory. By "thermal memory" is meant the simulation of an advantageous effect typical of thermal circuit-breakers (of a traditional type, i.e., non-electronic ones), which consists in preventing closing of the circuit by the circuit-breaker immediately after tripping due to overload. In fact, after tripping due to overload the portion of electrical network controlled by the circuit-breaker can be at temperatures close to the values that the device can withstand, and an immediate re-closing of the circuit could prove extremely dangerous. Whereas this function is naturally built into relays of a thermal type, it is virtually lost in the relay of an electronic type, which are substantially independent of temperature.

Various solutions have been experimented and used in the known art for simulating the thermal memory, for example with the use of a capacitor. Said solutions exploit the phenomenon of decay of the voltage across a capacitor charged at the moment of tripping of the relay for estimating the time that has elapsed; on said estimated time, there is then estimated the decay of the temperature in the portion of electrical network controlled by the circuit-breaker.

It is altogether evident that this type of simulation cannot yield sufficiently realistic results for various reasons, due, for example, to the tolerances of the capacitor and to the decay of the electrical characteristics typical of the components. The behaviour of the capacitors is also influenced by temperature, and since this phenomenon is far from controllable or foreseeable, it constitutes a further limit. Furthermore, the decay of the charge of the capacitor is a non-linear phenomenon, with consequent limits of precision.

This approximation results in an undesirable behaviour of the circuit-breaker, for example preventing re-closing of the circuit when this operation is technically safe, or enabling it when it is technically dangerous.

It is therefore evident that the known solutions only partially solve the drawbacks described above, but none of them has proven fully satisfactory.

SUMMARY OF THE INVENTION

The main purpose of the present invention is to provide a relay which, in the event of absence of supply, whether direct or auxiliary, will solve the cited problems of the known art.

The above task and the above purposes, as well as others that will appear more clearly from what follows, are achieved by an electronic protection device, in particular for automatic circuit-breakers, said electronic protection device comprising:

- a control unit;
- a warning interface;
- a supply system comprising a main supply system and a first back-up supply system; and
- an interface for connection between said supply system and said control unit.

In the device according to the invention the connection interface comprises an automatic device for passage from the main supply to the back-up supply in the event of interruption of said main supply.

Preferably, the electronic protection device according to the invention comprises warning means for warning said control unit that passage has occurred from the main supply to the back-up supply. Following upon said warning of passage from the main supply to the back-up supply, the control unit can then disable one or more pre-determined functions. According to a particularly preferred embodiment, said control unit, following upon a warning of passage from the main supply to the back-up supply, maintains active just the function of internal clock. Conveniently, the electronic protection device according to the invention, can comprise a device for restoring one or more pre-determined functions of said control unit.

Preferably, the electronic protection device according to the invention is provided with a back-up supply system, which comprises a first device having characteristics of short charging time and a second device having characteristics of long duration.

Furthermore, according to a particular embodiment, the supply system can conveniently comprise a system for regulating the voltage.

In the electronic protection device according to the invention, the back-up supply system can advantageously be charged by said main supply system. In this case, the electronic protection device according to the invention preferably comprises means for detecting the energy available coming from the main supply system and means for partializing the step of charging of said back-up system as a function of the energy available.

According to a particular embodiment, a feedback control system can be provided, which connects said back-up supply system with said control unit. Said feedback control system can, for example, be used by said control unit for managing the step of charging of said back-up supply system. Furthermore, the feedback control system can be used by said back-up supply unit for sending, to said control unit, information on the energy available in said back-up supply unit.

According to a particular embodiment, the electronic protection device according to the invention can comprise a second back-up supply system activatable separately from said first back-up supply system.

Advantageously, to optimize the energy consumption during the period in which the control unit is supplied by the back-up supply system, the electronic protection device according to the invention can comprise a device for disabling said control unit.

Preferably, in the electronic protection device according to the invention some pre-determined parts of said control unit are supplied only in conditions of full power, when said main supply system is active.

According to a particular embodiment of the electronic protection device according to the invention, said first back-up supply system supplies a real-time clock external to said control unit, it being possible for the control unit to be supplied by said first back-up supply system through manual activation.

Advantageously, following upon the restoration of one or more pre-determined functions of said control unit or following upon the manual activation of the control unit, also the display is activated and pre-determined information is sent thereto.

For a better understanding of the present invention, reference is made to the accompanying drawings and to the detailed description hereinafter, in which preferred but non-limitative embodiments of the electronic protection device according to the invention are illustrated.

DESCRIPTION OF THE PREFERRED EMBODIMENTS

Figure 1:
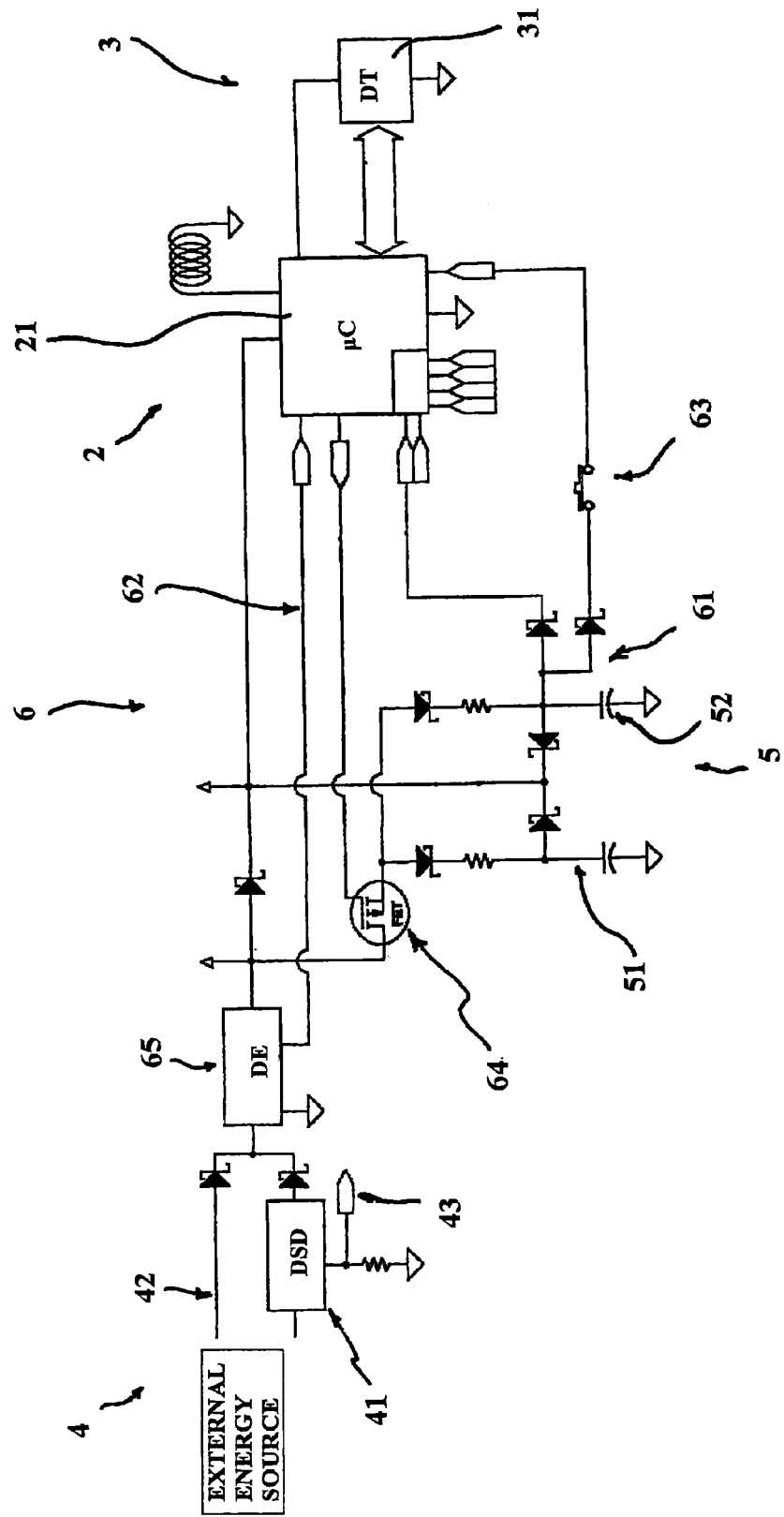
FIG. 1 is a block diagram illustrating an embodiment of an electronic protection device according to the invention.

With reference to FIG. 1, the electronic protection device according to the invention, designated as a whole by the reference number 1, comprises a control unit 2, for example constituted by, or at least comprising, at least one microcontroller (μC) 21. The device according to the invention moreover comprises a warning interface, for example including a display (DT) 31.

There is moreover provided a supply system, which comprises a main supply system 4 and a back-up supply system 5. The main supply system 4 can conveniently comprise a direct supply device (DSD) 41, for example one which draws the energy from the Amperonietric Transformers (TAs), and an auxiliary supply device 42, supplied by an external energy source.

The device according to the invention moreover comprises a connection interface 6 for connection between the supply system, constituted by the main supply system 4 and by the back-up supply system 5, and the control unit 2, and in particular with the microcontroller 21. The connection interface 6 comprises a device 61, which, following upon an interruption of the supply from the main energy source 4, determines automatic passage from said main supply system 4 to the back-up supply system 5.

According to a preferred embodiment, the microcontroller 21 receives, for example through a warning system comprising the line 62, information on the state of the supply, and in particular, on passage from the main supply system 4 to the back-up supply system 5. Following upon said warning and said passage, the microcontroller disables one or more pre-determined functions. In particular, for the purpose of minimizing the energy consumption it is preferable that, following upon passage from the main supply system 4 to the back-up supply system 5, just the function of internal clock, or "real-time clock", of the microcontroller will be kept active. In this way, the variable time remains always available and it can be used for subsequent processing operations. For this purpose, the device according to the invention can be conveniently equipped with a device 63 for restoring of one or more pre-determined functions of the microcontroller 21. The device 63 can be conveniently constituted by a push-button, or by a similar device that can be operated manually by an operator, said device enabling supply of the microcontroller 21 so as to restore its total functions or else, preferably, only one or more pre-determined functions.

Preferably, the back-up supply system 5 comprises at least one first back-up-supply device 51 and one second back-up-supply device 52, the first one of which presents characteristics of short charging time and the second one of which presents characteristics of long duration of charging time. In this way, thanks to the presence of the device with characteristics of short charging time, the need for having the back-up system ready for the supply is safeguarded even following upon brief periods of charging of the back-up system itself At the same time, the presence of the device with characteristics of long duration guarantees continuity of the supply even for relatively long periods of time.

Conveniently, the device according to the invention is also equipped with a system for regulating the voltage (not represented in the attached FIG. 1).

Charging of the back-up system 5 is preferably performed using the same main supply system 4. For this purpose, it is preferable for the device according to the invention to be equipped with means for detecting energy 65 available coming from the main supply system 4 and means for partializing 64 the step of charging of the back-up system 5 as a function of the energy available. In this way, the charging of the back-up system is prevented from subtracting a quantity of energy that is too high with respect to the one available in a given instant and necessary for proper operation of the microcontroller 21.

Advantageously, the back-up supply system 5 is connected to the microcontroller 21 through a feedback control system. In this way, it is possible, among other things, to manage the step of charging of the back-up supply system 5 through the microcontroller 21. At the same time, the back-up supply system 5 can send, to the microcontroller 21, information on the quantity of energy available in said back-up supply system 5.

As mentioned previously, one of the purposes of the device of the present invention is to guarantee the continuity of certain functions of the microcontroller following upon the interruption of the main supply, through an appropriate management of the back-up supply system. For the purpose of guaranteeing a redundancy of the continuity of supply, the device according to the invention can also comprise a second back-up supply system (not represented in the attached FIG. 1). Said second back-up supply system can be activated, either automatically or else manually, separately from said first back-up supply system 5.

Once again for the purpose of optimizing management of the back-up supply, it is likewise possible to provide a device for total disabling of the supply to the microcontroller, to be used when it is not necessary to maintain the functionality of the microcontroller itself operative.

Preferably, for the purpose of optimizing the management of the supply in conditions of emergency, the microcontroller 21 has some parts that are supplied only in conditions of "full power", namely, when the microcontroller itself is supplied by the main supply system 4. For the purpose of optimizing the energy consumption, these parts are not instead supplied in conditions of "low power", namely, when the microcontroller 21 is supplied by the back-up supply system 5.

According to an alternative embodiment, the back-up supply system 5 is used for supply in an automatic way only a real-time clock that can be internal or external to the control unit 2. The control unit 2 then receives the supply only following upon manual tripping by an operator. In this way, the need to maintain control of the variable time active is safeguarded, and at the same time the energy consumption is minimized during the step of emergency.

Advantageously, the restoration of one or more given functions through the restore device 63, as likewise the manual activation of the control unit in the case where the back-up system supplies just the real-time clock, also causes activation of the display 21 and sending of pre-determined information to said display. Once again for the purpose of minimizing energy consumption, it is possible to envisage that the display and the information displayed thereby will be active only for a pre-determined period of time, for example 10-15 seconds, a new manual input being then necessary for further displays.

The the electronic protection device thus conceived may undergo numerous modifications and variations, all of which fall within the scope of the inventive idea; moreover, all the items may be replaced by other technically equivalent ones.

We claim:

1. An electronic protection device for automatic circuit-breakers, said device comprising:
   a. a control unit;
   b. a warning interface;
   c. a supply system comprising a main supply system and a first back-up supply system;
   d. an interface for connection between said supply system and said control unit, said connection interface comprising an automatic device for passage from the main supply to the back-up supply in the event of interruption of said main supply;
   e. a restore device for restoring one or more pre-determined functions of said control unit, when said back-up supply is active, said restore device being manually operated by an operator; and
   f. a display, which is actuated when said pre-determined functions are restored, said display showing pre-determined information, said display being active for a pre-determined period of time only,
   wherein said electronic protection device comprises a warning system for warning said control unit that passage has occurred from said main supply to said back-up supply, and
   wherein said control unit, following upon a warning of passage from said main supply to said back-up supply, maintains just the fraction of internal clock active.

2. An electronic protection device according to claim 1, wherein said control unit, following upon a warning of passage from said main supply to said back-up supply, disables one or more pre-determined functions.

3. An electronic protection device according to claim 1, wherein said back-up supply system comprises a first device having characteristics of short charging time and a second device having characteristics of long duration charging time.

4. An electronic protection device according to claim 1, wherein said back-up supply system is charged by said main supply system.

5. An electronic protection device according to claim 4, further comprising means for detecting the available energy coming from the main supply system and means for partializing the step of charging of said back-up system as a function of the energy available.

6. An electronic protection device according to claim 1, said electronic protection device further comprising a feed-back control system that connects said back-up supply system with said control unit.

7. An electronic protection device according to claim 6, wherein said control unit manages the step of charging of said back-up supply system.

8. An electronic protection device according to claim 6, wherein said back-up supply unit sends, to said control unit, information on the energy available in said back-up supply unit.

9. An electronic protection device according to claim 1, further comprising a device for disabling said control unit.

10. An electronic protection device according to claim 1, wherein parts of said control unit are supplied only in conditions of "full power" when said main supply system is active.

11. An electronic protection device according to claim 1, wherein said first back-up supply system supplies a real-time clock, it being possible for the control unit to be supplied by said first back-up supply system through manual activation.

12. An automatic circuit-breaker, in particular a low-voltage one, comprising a device according to claim 1.

* * * * *